Jan. 25, 1966 R. H. BIRNEY ETAL 3,231,299
BALL JOINT
Filed June 15, 1960 2 Sheets-Sheet 1
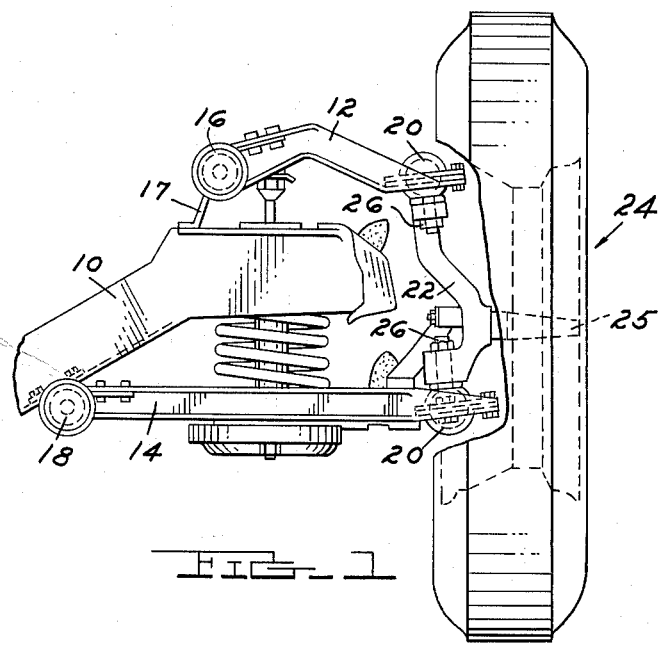
FIG. 1
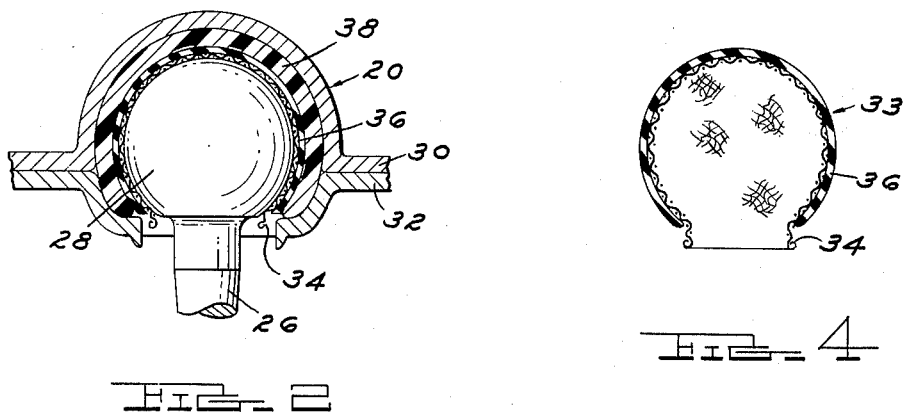
FIG. 2
FIG. 4
ROBERT H. BIRNEY
JOHN L. CHAIVRE
INVENTORS
BY John R. Faulkner
Clifford L. Sadler
ATTORNEYS

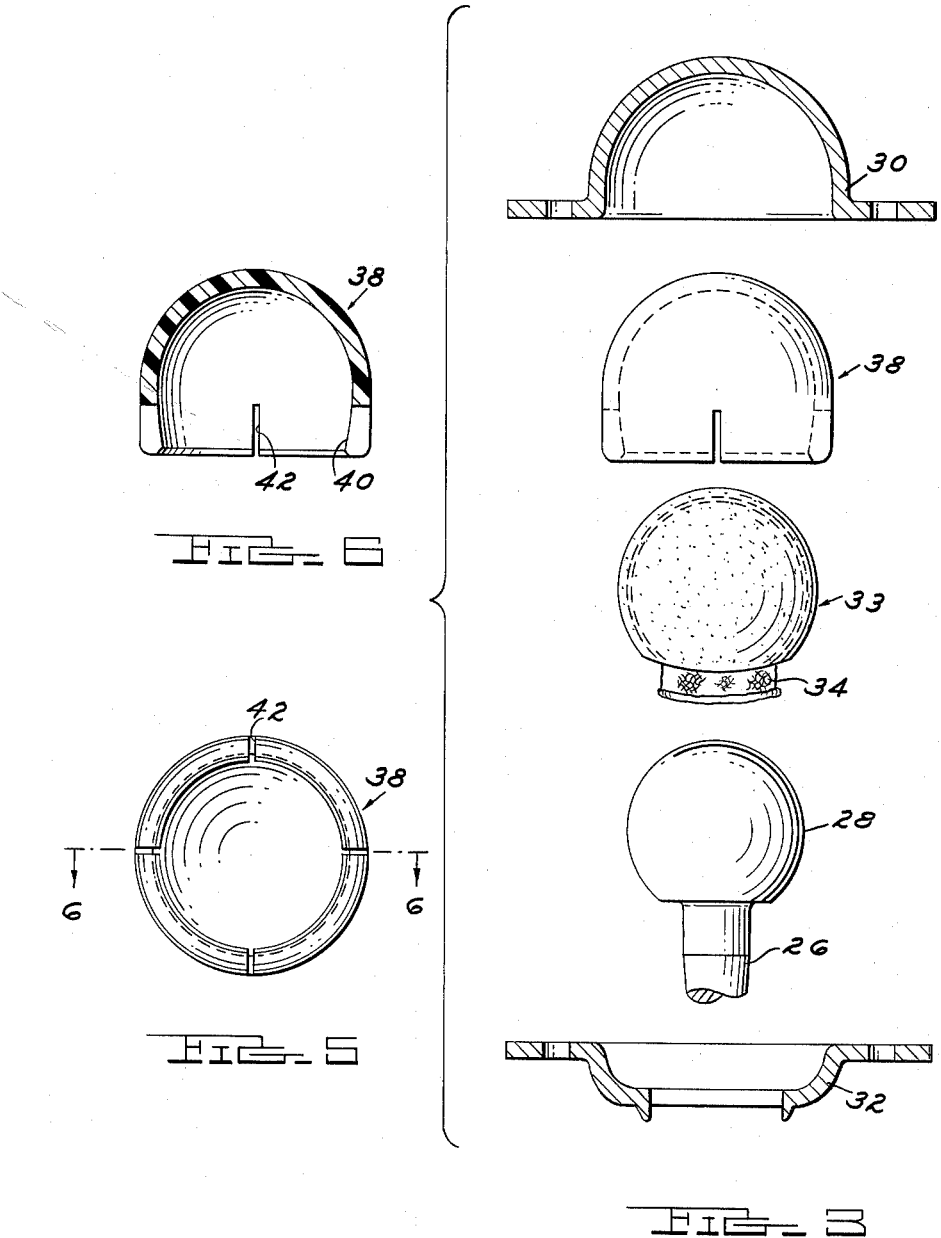

United States Patent Office 3,231,299
Patented Jan. 25, 1966

3,231,299
BALL JOINT
Robert H. Birney, Birmingham, and John L. Chaivre, Detroit, Mich., assignors to Ford Motor Company, Dearborn, Mich., a corporation of Delaware
Filed June 15, 1960, Ser. No. 36,279
4 Claims. (Cl. 287—87)

The present invention relates to ball and socket joints and more particularly to the construction of ball joints such as are used in automotive suspension and steering systems.

In the present state of the automotive art it is common practice to provide ball and socket type joints for connecting the outer ends of the upper and lower support arms of an independent front suspension to the upper and lower ends of the wheel spindle and at the inner and outer ends of the steering tie rods. These ball joints have been constructed by a great variety of methods including processes employing moldable synthetic resins.

The present invention constitutes an improvement in the manufacture of ball and socket joints where synthetic resinous materials are used. This invention provides a sock-like piece knitted from low friction plastic fibers, such as fibrous linear polyethylene or tetrafluoroethylene, as the bearing surface in contact with the ball. The knitted sock is then fitted over the spherical end of a stud or ball portion of a point. A cushiony barrier layer of an elastomeric plastic is molded about and interlacing the sock liner. The sock with the barrier layer is then positioned about the ball and the assembly held in the socket by any one of several methods, such as by injecting a moldable plastic material between the outer surface of the plastic coated sock and the inner surface of the socket.

An alternate method of holding the sock in place includes separately molding the plastic backup piece, heating the piece until it approaches a plastic state and then snapping it over the covered sock.

When secured about the ball, the sock serves as a low friction liner for the socket. Regardless of the particular method employed to position the sock, it is to be retained firmly against the ball to provide an initial friction loading of the joint to prevent a sloppy action in operation.

It is an object of the present invention to provide a ball joint assembly adaptable to automobile suspension systems and other uses that require a joint characterized by its simplicity, economy of manufacture and superior operation.

It is a further object of the present invention to provide a ball and socket type joint assembly having a knitted plastic member which forms a low friction surface for the socket in sliding contact with the ball portion of the joint.

It is also an object to provide a ball joint of this invention in which a low friction knitted liner is placed over a ball and an elastomeric material layer is interposed between it and the socket.

It is still another object to provide in such a joint having a low friction knitted liner, means for preloading the joint by securing or pressing the liner tightly against the ball.

These and further objects of the present invention will become apparent from the following description and the accompanying drawings, in which:

FIGURE 1 is a front elevational view of an automotive front suspension incorporating a ball joint construction in accordance with the present invention;

FIGURE 2 is an elevational view partly in section of the ball joint used in FIGURE 1;

FIGURE 3 is an exploded view of the components used to form the joint of FIGURE 2;

FIGURE 4 is an elevational view in section of the low friction liner;

FIGURE 5 is a bottom and plan view of the backup piece, and

FIGURE 6 is a sectional view taken along section lines 6—6 of FIGURE 5.

Referring now to the drawings for a more detailed description of this invention wherein like reference numerals throughout the various views identify like parts, FIGURE 1 shows a portion of an automotive independent front suspension system which includes a frame or structural member 10 that pivotally supports upper and lower wheel support arms 12 and 14, respectively.

The inner end of upper arm 12 is pin mounted at 16 to a bracket 17 carried by the frame member 10. The inner end of the lower support arm 14 is pin mounted at 18 to another portion of frame member 10. The outer ends of the arms 12, 14 are provided with ball joints 20 which are connected to a steerable wheel spindle 22. The spindle 22 rotatably carries a wheel and tire assembly 24 on a stub axle 25.

The upper and lower ball joints 20 are identical and permit universal movement between the spindle 22 and the arms 12 and 14 as required for steering the wheel 24 or for jounce and rebound deflections induced by road conditions.

As seen in FIGURES 2 and 3 the ball joint 20 is comprised in part of a stud member 26 having a ball or spherical head 28, upper and lower socket members 30 and 32, and a low friction liner 33 which slidably receives the ball 28.

In the present invention the low friction liner 33 is of composite construction, having a sock shaped piece 34 with an outer coating 36. The sock 34 is fabricated from a low friction synthetic resinous material which may, for example, be tetrafluoroethylene. Fibers of the low friction plastic are knitted in a conventional fashion to form the sock 34. Being knitted, it is stretchable and can therefore be made slightly undersize so that when it is fitted over the ball 28 it will stretch to hug the ball 28 tightly.

The completion of the low friction liner 33 requires placing the sock 34 over the ball 28 or over a die of similar shape. The barrier coat 36 is formed about the sock 34 by any of several methods such as dipping, spraying, or molding. This barrier coat 36 is a relatively thin layer and its material selected from that group of elastomeric plastics which will adhere to the sock material. Where the sock 34 is formed of tetrafluoroethylene it has been found that rubber will work satisfactorily as the barrier coat 36. Where a low friction plastic material such as tetrafluoroethylene or linear polyethylene is used for the sock 34 and it is held tightly against the ball 28, the friction is proportional to the velocity and frequency of movement between the ball surface and the liner surface. As the velocity or frequency of relative movement increases the friction will also increase. This characteristic is sometimes referred to as viscose dampening. Such a quality in a ball joint suspension system for automobiles is highly desirable as it reduces wheel fight at high speed.

In order to make maximum efficient use of the relatively expensive low friction plastic materials the sock 34 is knitted from strands or threads. Because that portion of the liner 33 is knitted to shape, there is no excess material or scrappage as compared with other methods of fabrication of a liner, for example, forming a liner by pulling a flat piece of plastic to shape over a die.

Means are provided to hold the low friction liner 33 about the ball 28 within the socket parts 30 and 32. Such means include placing the liner 33 about the ball 28, inserting the ball 28 between the socket parts 30, 32 and injection molding a plastic backup layer through an opening provided in one of the socket parts into the cavity between the socket parts 30, 32 and the barrier coat 36. In this molding operation the barrier coat 36 serves to prevent the bleed-through of the backup material and to permit the sock 34 to be bonded into position.

In accordance with this method of constructing the joint 20, the material for the backup layer is selected from that group of plastic which will shrink upon molding. This characteristic will preload the joint 20 in order to provide appropriate dampening qualities desired of a good ball joint. With this method the backup layer may be a casting resin such as epoxy or molded of nylon reinforced with fiberglass. These are examples of but two of several acceptable materials.

An alternate method of holding the low friction liner 33 in position provides for the formation of a separate backup piece 38. In this construction the backup piece 38 is molded of a thermoplastic to a generally cup shape. The skirt of the cup is provided with an inner surface which converges slightly inwardly as at 40 and several axial slits 42 are provided about its edge.

The cup 38 is formed of a rigid plastic and is normally too stiff to be slipped over the liner 33 and ball 28. Therefore, the premolded backup piece 38 is heated until it is soft enough to permit the piece to be snapped over the liner covered ball. This may be done as a separate heating operation or it may be done at the time the backup piece 38 is still warm from its original molding operation.

In order to assemble the joint 20 of FIGURE 2, the liner 33 is stretched over the ball 28, the backup piece 38 is snapped over the liner 33 in a heated condition and the socket parts 30, 32 are closed about the assembly. The socket parts 30, 32 are secured together by bolting, riveting or other appropriate means. These several pieces are selected of such dimension so that the liner 33 is held snugly against the ball 28. As seen in FIGURE 2 the skirt portion of the cup shaped piece 38 is bent inwardly by the pressure of the lower socket part 32 so as to surround the liner 33. This construction provides for a prestressing of the low friction fibers of the sock 34 and the required preloading of the joint.

The elastomeric barrier coat 36 serves a very important function of acting as a cushion in the finished ball joint in addition to its other properties. Although great care is taken to machine a perfectly spherical ball 28 it is not entirely possible to avoid some out-of-roundness. Similarly, the backup piece 38 may not be dimensionally true. While these irregularities may be very small, they are sufficient to affect the smooth operation of the joint. By inserting an intermediate elastomeric layer, irregularities which exist in the surface of the ball 28 and in the backup piece 38 will be compensated for during the articulation of the joint by the deformation of the elastomeric barrier coat 36.

Further improvements of the joint 20 of FIGURE 2 include means for assuring that the liner 33 will not move relatively to the backup piece 38. This can be done by molding a rough exterior surface on the barrier coat 36 or in the alternative providing an adhesive on the exterior surface of the liner 33 so that when the joint is assembled the parts will be cemented together. Similarly, an adhesive may be injected between the piece 38 and the socket parts 30 and 36 to prevent relative movement between those parts.

In accordance with the present invention, a superior ball joint is provided which may be manufactured by inexpensive and simplified methods. Further improvements may occur to those skilled in the art which will come within the scope and spirit of the appended claims. Where particular materials have been suggested, such has been done for purposes of illustration and not limitation, equivalents may be substituted for the satisfactory practice of this invention.

We claim:
1. A joint assembly having ball and socket parts and liner means interposed between said parts, said liner means comprising a low friction fabric piece positioned about said ball part, said piece being characterized before its assembly in said joint by its being of sock shape and both flexible and stretchable, the interior size of said piece being sufficiently less than the exterior size of said ball part so that when said piece is stretched and positioned about said ball part it will be in snug bearing contact with substantially more than a hemispherical portion of said ball, a premolded hard backup member surrounding said piece, said member being of a generally cup shape with a partially spherical internal configuration, said member being hard at ambient temperatures and pliable at an elevated temperature, said member having a mouth portion of smaller diameter than its greatest internal diameter, said member having slots dividing said mouth portion into circumferential spaced apart segments.

2. A method of making a joint assembly having ball and socket parts comprising the steps of: forming a sock shaped stretchable bearing liner of a single continuous layer of low friction fabric, said liner being formed to have an internal size less than the external size of said ball, covering said liner with an elastomeric layer, stretching said liner and positioning it about said ball, molding a separate cup shaped backup piece, said piece being substantially rigid at room temperature and pliable at an elevated temperature, said piece having an opening of less size than the exterior size of said elastomeric layer when said liner is positioned about said ball, positioning said piece about said elastomeric layer when said piece is at a sufficiently elevated temperature as to be pliable, and enclosing said backup piece between sheet metal socket members.

3. A method of making a joint assembly having ball and socket parts comprising the steps of: forming a sock shaped stretchable bearing liner of low friction fabric, said liner being formed to have an internal size less than the external size of said ball, stretching said liner and positioning it about said ball, molding a separate cup shaped backup piece, said piece being substantially rigid at room temperature and pliable at an elevated temperature, said piece having an opening of less size than the exterior size of said liner when positioned about said ball, positioning said piece about said liner when said piece is at a sufficiently elevated temperature as to be pliable, and enclosing said backup piece between sheet metal socket members.

4. A method of making a joint assembly having ball and socket parts comprising the steps of: forming a bearing liner and positioning it about said ball, molding a separate cup shaped backup piece, said piece being substantially rigid at room temperature and pliable at an elevated temperature, said piece having an opening of less size than the exterior size of said liner when positioned about said ball, positioning said piece about said liner when said piece is at a sufficiently elevated temperature as to be pliable, and enclosing said backup piece between sheet metal socket members.

References Cited by the Examiner
UNITED STATES PATENTS
| | | | |
|---|---|---|---|
| 2,804,886 | 9/1957 | White. | |
| 2,906,552 | 9/1959 | White | 288—17 |
| 2,944,831 | 7/1960 | Thomas | 287—90 |
| 3,011,219 | 12/1961 | Williams. | |
| 3,017,209 | 1/1962 | Thomas. | |

FOREIGN PATENTS
| | | |
|---|---|---|
| 1,181,482 | 1/1959 | France. |

DON A. WAITE, *Primary Examiner.*

JACOB A. MANIAN, FRANK SUSKO, MILTON KAUFMAN, ROBERT C. RIORDON, *Examiners.*